United States Patent [19]

Edamura et al.

[11] Patent Number: 5,374,367
[45] Date of Patent: Dec. 20, 1994

[54] ELECTRO-SENSITIVE COMPOSITION

[75] Inventors: Kazuya Edamura, Tokyo; Yasufumi Otsubo, Chiba, both of Japan

[73] Assignee: Fujikura Kasei Co., Ltd., Tokyo, Japan

[21] Appl. No.: 102,759

[22] Filed: Aug. 6, 1993

[30] Foreign Application Priority Data

Aug. 7, 1992 [JP] Japan .................. 4-211834
Aug. 27, 1992 [JP] Japan .................. 4-288947

[51] Int. Cl.$^5$ .................. C10M 171/00; C10M 169/04
[52] U.S. Cl. .................. 252/79; 252/76; 252/572
[58] Field of Search .................. 252/572, 579, 580, 76, 252/79; 570/127, 128; 562/474

[56] References Cited

FOREIGN PATENT DOCUMENTS

0150994A1 8/1985 European Pat. Off. .
0478034A1 4/1992 European Pat. Off. .
77-105141 9/1977 Japan .
56-140951 11/1981 Japan .
2236761A 4/1991 United Kingdom .

*Primary Examiner*—Christine Skane
*Attorney, Agent, or Firm*—Finnegan, Henderson, Farabow, Garrett & Dunner

[57] ABSTRACT

An electro-sensitive composition comprising a fluorine compound having a predetermined/structure, and an electrically insulating medium capable of dissolving this fluorine compound when a voltage is applied thereto, is disclosed. This electro-sensitive composition has a straight chain or cyclic fluorocarbon, and fluorine compound particles possessing dissociable polarity, dispersed in an electrically insulating medium; by means of the application of a voltage to this electro-sensitive composition, the transparency and viscosity thereof can be easily adjusted.

3 Claims, No Drawings

ELECTRO-SENSITIVE COMPOSITION

BACKGROUND OF THE INVENTION

1. Field of the Invention

The present invention relates to an electro-sensitive composition, and in particular to an electro-sensitive composition, the characteristics Of which, such as the optical characteristics, viscosity, or the like, can be altered by the application of a voltage.

2. Background Art

Conventionally, electro-sensitive compositions such as electrorheological fluid compositions (hereinbelow referred to as "ER fluid compositions"), liquid crystal compositions, and the like, are known.

An ER fluid composition is a fluid which is obtained by, for example, dispersing solid particles in a medium having electrically insulating properties; such a fluid composition possesses properties such that when a voltage is applied thereto, the viscosity thereof increases; that is to say, such a fluid composition possesses an electrotheological effect (hereinbelow referred to as an "ER effect").

This type of an ER effect is known as a "Winslow Effect"; when such a composition is placed between electrodes and a voltage is applied thereto, the solid particles dispersed in the composition are polarized as a result of the action of the electric field which is generated between the electrodes, and based on this polarization, the solid particles are arranged and linked to one another in the direction of the electric field by means of electrostatic attraction, and an effect of resistance to external shearing flow is exhibited.

As ER fluid compositions exhibit the ER effect described above, it is expected that such fluid compositions will find applications as fluids for braking or power transmission in apparatuses operating by means of electric control, such as clutches, dampers, shock absorbers, valves, actuators, vibrators, printers, vibrating devices, or the like.

Concrete examples of conventionally known ER fluid compositions include fluid compositions in which solid particles having surfaces which absorb and retain water, such as silica gel particles, cellulose particles, starch particles, casein particles, polystyrene-type ion exchange resin particles, or the like, are dispersed in electrically insulating oils such as silicone oil, diphenylchloride, transformer oil, or the like. Furthermore, ER fluids using inorganic solid particles having a low electric conductivity, including semiconductors, as the solid particles (Japanese Patent Application, First Publication, Laid Open No. 2-91194), and ER fluids using inorganic ion exchange particles comprising hydroxides of polyvalent metals, hydrotalcites, acid salts of polyvalent metals, hydroxyapatite, Nashicon (Na ion superionic conductor)-type compounds, clay minerals, potassium titanares, heteropoly acid salts, or insoluble ferrocyanides, as the solid particles (Japanese Patent Application, First Publication., Laid-Open No. 3-200897), are known.

Conventional ER fluid compositions were heterogeneous systems (dispersion systems) in which the solid particles were dispersed in an electrically insulating medium, as explained above, so that in the course of the use or storage, the solid particles tended to condense and precipitate as a result of the attraction therebetween, and to,be deposited on electrodes and vessel walls, so that storage stability problems existed which adversely effected the applicability of the ER fluids.

Furthermore, in recent years the use of ER fluid compositions in automobile engines and the like as a lubricating oil has been tested. These tests were based on the idea that, the viscosity of standard lubricating oils declined as the temperature rose, and ER fluid compositions also experienced reduction in viscosity as temperature rose in the same manner in the state in which a voltage was not applied; however, if a voltage was applied to such a fluid, the effect of an increase in viscosity thereby would cancel the decrease in viscosity resulting from the rise in temperature, and as a result, it would be possible to maintain a predetermined viscosity irrespective of temperature.

However, in this case, as well, because the conventional ER fluid compositions were heterogeneous systems containing solid particles, it proved impossible to overcome the problems of abrasion during use as lubricating oils, and such ER fluid compositions thus proved unfit for a practical use.

There was thus a demand for fluid compositions which were homogeneous systems, and moreover were capable of variations in viscosity in response to the application of voltage.

In contrast, liquid crystal compositions are compositions capable of variations in crystal arrangement in a liquid phase as a result of the application of voltage, and as a result of this variation, the optical characteristics thereof are varied. As a result of this characteristic, such liquid crystal compositions have found use primarily as liquid crystal display elements.

Conventional liquid crystal compositions were capable of variation in optical characteristics as a result of the application of a voltage; however, this phenomena was observed only between special electrodes which were disposed with an extremely small gap therebetween and which had the oriented surfaces; furthermore, in order to make this optical variation visible, a complicated structure as required in which polarizing plates or phase contrast plates were incorporated, so that the price thereof was high and accordingly such liquid crystal compositions found use only in small flat plate-type displays.

Thus, a composition capable of variation in optical characteristics without the need of such a complicated structure has been desired.

SUMMARY OF THE INVENTION

The electro-sensitive composition of the present invention comprises at least one of the fluorine compounds shown in formulas (1) through (4), and an electrically insulating medium capable of dissolving these fluorine compounds when a voltage is applied thereto.

$$R_1-(CF_2)_n-(CH_2)_m-R_2 \tag{1}$$

[In the formula,
R$_2$ indicates CH$_2$OH, COOH, COOM (M indicates an alkali metal or a primary to quaternary ammonium salt), or CH$_2$SH,
n indicates an integer within a range of 3–30, and
m indicates an integer within a range of 0–2.]

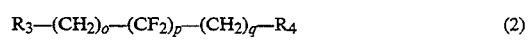

$$R_3-(CH_2)_o-(CF_2)_p-(CH_2)_q-R_4 \tag{2}$$

[In the formula,

R3 and R4 indicate CH2OH, COOH, COOM (M indicates an alkali metal or a primary to quaternary ammonium salt), or CH2SH, respectively,
o indicates an integer within a range of 0-2,
p indicates an integer within a range of 2-20, and
q indicates an integer within a range of 0-2.]

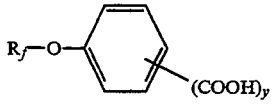
(3)

(In the formula,
$R_f$ indicates $C_{3x}F_{6x-1}$,
x indicates an integer within a range of 2-4, and
y indicates an integer within a range of 1-3.

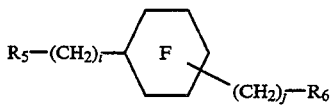
(4)

[In the formula,
R5 and R6 indicate CH2OH, COOH, COOM (M indicates an alkali metal or a primary to quaternary ammonium salt), or CH2SH, respectively, and
i and j indicate integers within a range of 0-2.

When a voltage is not being applied to the electro-sensitive composition of the present invention, the fluorine compound is uniformly dispersed in the electrically insulating medium and is in white suspension therein. However, when a voltage is applied, in this composition, a portion of the solid particles in the composition are dissolved, and the remainder enter an electrophoretic state through electrohydrodynamically unstable motion, the composition becomes transparent, and the viscosity thereof is increased.

Accordingly, the electro-sensitive composition of the present invention may be used as an engine lubricating oil, clutch fluid, a damper material, a fluid for filling shock absorbers, valve lubricating oil, an actuator fluid, a vibrator filling material, machine lubricating oil, printer ink, or for power transmitting, braking or lubricating oil in devices operating by means of electric control such as vibrating devices or the like.

Furthermore, the electro-sensitive composition of the present invention is capable of varying the degree of transparency thereof by means of the application of a voltage, so that such composition may be used as an optical shutter, an optical sensor, an optical switch, a shading material, a pressure sensor, a display, or the like.

DETAILED DESCRIPTION OF THE INVENTION

The electro-sensitive composition of the present invention comprises at least one of the fluorine compounds depicted in formulas (1) to (4) below, and an electrically insulating medium capable of dissolving this fluorine compound when a voltage is applied thereto.

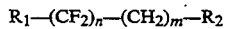
(1)

[In the formula,
$R_1$ indicates H, F, Cl, Br, or I,

R2 indicates CH2OH, COOH, COOM (M indicates an alkali metal or a primary to quaternary ammonium salt), or CH2SH,
n indicates an integer within a range of 3-30, and
m indicates an integer within a range of 0-2.]

$$R_3\text{—}(CH_2)_o\text{—}(CF_2)_p\text{—}(CH_2)_q\text{—}R_4 \qquad (2)$$

[In the formula,
R3 and R4 indicate CH2OH, COOH, COOM (M indicates an alkali metal or a primary to quaternary ammonium salt), or CH2SH, respectively,
o indicates an integer within a range of 0-2,
p indicates an integer within a range of 2-20, and
q indicates an integer within a range of 0-2.]

(3)

(In the formula,
$R_f$ indicates $C_{3x}F_{6x-1}$,
x indicates an integer within a range of 2-4, and
y indicates an integer within a range of 1-3.)

(4)

[In the formula,
R5 and R6 indicate CH2OH, COOH, COOM (M indicates an alkali metal or a primary to quaternary ammonium salt), respectively, and
i and j indicate integers within a range of 0-2.]

The compounds of formulas (1) and (2) above are commonly known as aliphatic compounds containing fluorine. These compounds comprise a straight chain-type fluorocarbon chain and a terminal group possessing a polar functional group possessing dissociability.

In particular, in the compound of formula (1) which is used in the electro-sensitive composition Of the present invention, the fluorocarbon chain contains 3-30, and more preferably 3-20, connected CF2 groups. Furthermore, the terminal group possessing a dissociable polar functional group is a group such as a hydroxymethyl group, a carboxyl group, a primary to quaternary ammonium salt or an alkali metal salt of a carboxyl group, or a mercaptomethyl group, or the like; it is bound to only one end of the fluorocarbon chain.

Concrete examples of this type of compound include, for example,
F(CF2)8CH2CH2OH, F(CF2)10CH2CH2OH, F(CF2)2aCH2CH2OH (a mixture in which "a" represents an integer ranging from 3-8) (marketed by Asahi Glass Co.,Ltd. under the name Cm alcohol), F(CF2)9CH2OH, H(CF2)8CH2OH, H(CF2)8COOH, F(CF2)7COOH, F(CF2)17COOH, etc.

The compound of formula (2) has terminal groups possessing dissociable polar functional groups bound to both ends of a straight chain-type fluorocarbon chain.

In these compounds, it is not necessary that the polar functional groups of both terminal groups be identical. Furthermore, it is not necessary that the alkyl chain ($(CH_2)_o$ and $(CH_2)_q$) of both terminal be identical in length.

In particular, in the compound shown in formula (2) which is used in the electro-sensitive composition of the present invention, the fluorocarbon chain contains 2–20, and more preferably 2–12, connected $CF_2$ groups. Furthermore, the dissociable polar functional groups positioned at both terminals comprise hydroxymethyl groups, carboxyl groups, alkali metal salts or primary through quaternary ammonium salts of carboxyl groups, or mercaptomethyl groups, or the like.

Concrete examples of such compounds include:
$HOOC(CF_2)_2COOH$, $HOOC(CF_2)_3COOH$, $HOOC(CF_2)_6COOH$, $HOOC(CF_2)_8COOH$, $HOCH_2(CF_2)_3CH_2OH$, $HOCH_2(CF_2)_6CH_2OH$, $HOCH_2(CF_2)_8CH_2OH$, etc.

The formula depicted in (3) is commonly known as a perfluoroalkylenoxy aromatic acid.

In particular, in the compound shown in formula (3) which is used in the electro-sensitive composition of the present invention, the perfluoroalkylenoxy side chains are straight chains possessing 6, 9, or 12 Carbon atoms. Furthermore, from 1 to 3 carboxyl groups are bound to the aromatic ring.

Concrete examples of thus type of compound include the following:

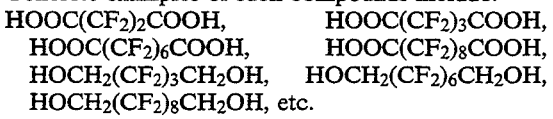

(5)

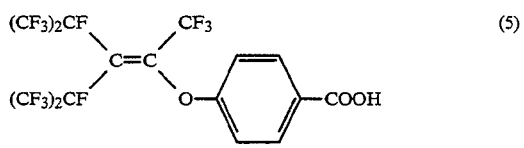

(6)

The compounds shown in formula (4) are commonly known as ring form aliphatic compounds containing fluorine. These compounds posses a ring form fluorocarbon and two dissociable functional groups.

Concrete examples of such compounds include the following:

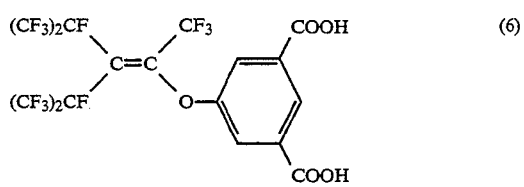

(7)

(8)

(9)

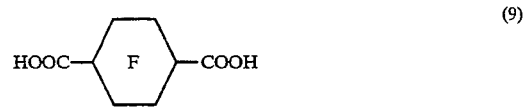

etc.

The fluorine compounds shown in formulas (1) to (4) may be manufactured by means of commonly known methods, and as some of these compounds are commercially available, they can be easily acquired.

In the electro-sensitive composition of the present invention, it is possible to use these fluorine compounds individually, or to use two or more such compounds in a mixture.

The electrically insulating medium used in the present invention is a medium possessing electrically insulating properties and which is capable of dissolving the above fluorine compounds when a voltage is applied thereto. This type of solvent possesses the characteristic of solvating the fluorine compounds which are polarized by means of the application of a voltage.

Representative electrically insulating media possessing this solvating effect include media possessing groups such as methyl groups or methylene groups which are capable of solvation by means of hydrogen bonds; however, the solvation effect is not restricted to hydrogen bonds.

Concrete examples of the electrically insulating medium used in the present invention include, for example, silicone oil, sebacates, trimellitates, partially hydrated triphenyl, phosphazene oil, adipinates, phthalates, aliphatic carboxylates such as vegetable oils or the like, aliphatic hydrocarbons such as refined kerosene and the like, alkylated aromatic hydrocarbons, halogenated aliphatic or aromatic hydrocarbons, ethers, phosphazenes, and the like; these may be used singly or in a mixture of two or more of the above.

In this type of electrically insulating medium, the above fluorine compounds are solvated and become transparent even when voltage is not applied. In this case, by mixing in another electrically insulating medium having a small solvation force in an appropriate amount, and thus adjusting the solvation force of the mixed medium, it is possible to arrive at the electro-sensitive composition of the present invention.

Among these media, silicone oil is particularly preferable in view of its superior electrically insulating properties, thermal stability, storage stability, lack of moisture absorption, noncorrosive properties, and ease of handling.

The mixing proportions of the fluorine compounds with respect to the electrically insulating medium described above are not particularly restricted; it is possible to select the amount of this fluorine compound in accordance with the desired variation in viscosity and variation in optical characteristics, so long as the fluorine compound can be stably partly dissolved in the medium during the application of voltage.

For example, the mixing proportions of the fluorine compounds shown in formulas (1) to (4) above with respect to the electrically insulating medium should preferably be within a range of 0.1–35 wt %, and more preferably within a range of 1–15 wt %.

In the manufacturing of the electro-sensitive composition of the present invention, particles of the fluorine compound shown in formulas (1) to (4) above and the electrically insulating medium may be simply mixed and sufficiently agitated at room temperature.

Furthermore, in addition to the fluorine compound and electrically insulating medium, it is possible to mix additives into the electro-sensitive composition of the present invention; these additives include, for example, appropriate stabilizers, dispersants, antioxidants, flame retardants, thermal stabilizers, ultraviolet absorbers, antifoamers, fungicides, colorants, and the like.

The electro-sensitive composition of the present invention which is manufactured in this manner is in uniform white suspension when a voltage is not being applied thereto. That is to say, in such a state, the fluorine compound particles are uniformly dispersed in the electrically insulating medium. Accordingly, this composition has light scattering property and low viscosity.

The present inventors have discovered that when a voltage is applied to this composition, the composition becomes transparent, and furthermore, the viscosity thereof increases; the present inventors have thus arrived at the present invention.

That is to say, the degree of transparency and the viscosity of the electro-sensitive composition of the present invention change when this composition is placed between electrodes and a DC voltage is applied to these electrodes. This change is such that, with respect to the degree of transparency, the transparency increases when a voltage is applied, and with respect to viscosity, the viscosity rises when a voltage is applied.

This change is thought to occur by means of the following mechanism; however, the present invention is not limited to this kind of mechanism.

When a voltage is applied to the electro-sensitive composition of the present invention, the fluorine compound described above is polarized by the action of the electric field produced between the electrodes. Subsequently, this polarized fluorine compound is solvated in the electrically insulating medium containing, for example, methyl groups or methylene groups, and thereby, this compound is dissolved in the electrically insulating medium, and the composition becomes transparent. Furthermore, the particles are arranged in the direction of the electric field as a result of the electrostatic attraction arising from the polarization of the fluorine compound, and as a result of the influence of the electrohydrodynamically unstable motion, the viscosity rises as a result of resistance to external shearing flow.

The voltage which is applied to the electro-sensitive composition of the present invention is not particularly limited; however, a range of 0.1–10 KV/mm, and more preferably, a range of 0.5–3 KV/mm, is appropriate.

When the voltage applied to the electro-sensitive composition of the present invention is cut off in the state in which this composition has been made transparent by means of the application of a voltage, some compositions maintain the transparent state, while others return to a state of white suspension after a period of from approximately 10 minutes to 24 hours after the cut-off of voltage. Furthermore, there are compositions which return immediately to a state of white suspension when a shearing force is applied after voltage has been cut off in the state in which the composition has been made transparent as a result of the application of a voltage. These changes of state arise as a result of the type of fluorine compound and electrically insulating medium, as well as the mixing proportions. Accordingly, by the appropriate selection of such components, it is possible to utilize the electro-sensitive composition of the present invention effectively in a wide variety of industrial fields.

The electro-sensitive composition of the present invention having the characteristics described above can be utilized, for example, as a fluid, the viscosity of which can be adjusted by means of the application of a voltage, such as an engine lubricating oil, a clutch fluid, a damper material, a shock absorber filling fluid, a valve lubricating oil, an actuator fluid, a vibrator filling material, a machine lubricating oil, printer ink, or as a power transmission, braking, or lubricating oil in apparatuses operating by means of electric control, such as vibrating devices or the like.

Furthermore, it is possible to vary the degree of transparency of the electro-sensitive composition of the present invention by applying a voltage and shearing force thereto, so that the composition can be used as, for example, an optical shutter, an optical sensor, an optical switch, a shading material, a pressure sensor, a display, or the like.

EXAMPLES

Hereinbelow, examples of the present invention will be explained.

Example 1

$F(CF_2)_8CH_2CH_2OH$ (produced by Daikin Fine Chemical Laboratory, A-1820) was dispersed uniformly in silicone oil having a viscosity at room temperature of 0.1 Pa.s (produced by Toshiba Silicone Co., Ltd., TSF451-100) so that the amount contained thereof was 5 wt %, and the electro-sensitive composition of Example 1 was thus prepared.

This composition was in a state of white suspension.

This composition was placed in a concentric-cylinder viscometer, a DC voltage of 2 KV/mm was applied between the inner and outer cylinders at a temperature of 25° C., rotation was applied to the inner cylinder electrode, and the transparency of the composition was visually evaluated while agitating this composition Furthermore, the rate of rotation of the inner cylinder was varied, and the shear stress (Pa) at each shear rate ($s^{-1}$), and the current density ($\mu A/cm^2$) between the inner and outer cylinders during shear stress measurement, were measured. The results of the measurement are shown in Table 1.

Example 2

A process was followed which was identical to that of Example 1, with the except ion that in place of the $F(CF_2)_8CH_2CH_2OH$ which was used in Example 1, $F(CF_2)_7COOH$ (produced by Daikin Fine Chemical Laboratory, C-1700) was used, and the electro-sensitive composition of Example 2 was obtained.

This composition was in a state of white suspension.

The degree of transparency of the composition during voltage application, and the shear stress and current density at each shear rate, were measured in a manner identical to that of Example 1. The results are shown in Table 2.

Example 3

A process was followed which was identical to that of Example 1, with the exception that in place of the $F(CF_2)_8CH_2CH_2OH$ which was used in Example 1, the compound shown in formula (5) (produced by Neosu Co., Ltd.) was used, and the electro-sensitive composition of Example 3 was obtained. This composition was in state of white suspension.

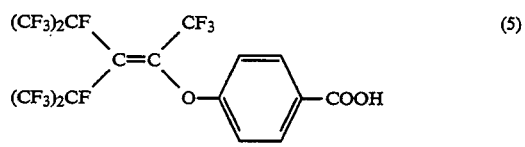

(5)

DC voltages of 0.5 KV/mm, 1.0 KV/mm, 1.5 KV/mm, and 2.0 KV/mm were applied to this composition, and the transparency, and shear stress and current density at various shear rate, were measured in a manner identical to that of Example 1. The results thereof are shown in Table 3.

Example 4

A process was followed which was identical to that of Example 3, with the exception that in place of the silicone oil which was used in Example 3, dioctylsebacate (DOS) (produced by Kyowa Hakko Kogyo Co., Ltd.) was used, and the electro-sensitive composition of Example 4 was obtained.

This composition was in a state of white suspension.

The transparency, and shear stress and current density at various shear rate, during the application of a DC voltage of 2.0 KV/mm to this composition, were measured in a manner identical to that of Example 1. The results are shown in Table 4.

Example 5

A process was followed which was identical to that of Example 1, with the exception that in place of the $F(CF_2)_8CH_2CH_2OH$ which was used in Example 1, the compound shown in formula (6) (produced by Neosu Co., Ltd.) was used, and the electro-sensitive composition of Example 5 was obtained. This composition was in a state of white suspension.

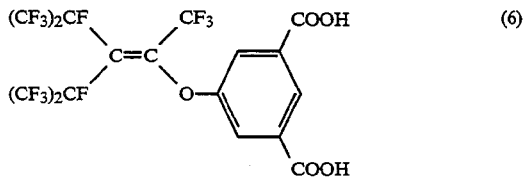

(6)

DC voltages of 0.5 KV/mm 1.0 KV/mm, 1.5 KV/mm and 2.0 KV/mm were applied to this composition, and the transparency, and shear stress and current density at various shear rate, were measured in a manner identical to that of Example 1. The results thereof are shown in Table 5.

Example 6

A process was followed which was identical to that of Example 1, with the exception that in place of the $F(CF_2)_8CH_2CH_2OH$ which was used in Example 1, $F(CF_2)_9CH_2OH$ (produced by Idemitsu Petrochemical Co., Ltd.) was used, and the electro-sensitive composition of Example 6 was obtained. This composition was in a state of white suspension.

The transparency, and shear stress and current density at various shear rate, during the application of voltage to this composition, were measured in a manner identical to that of Example 1. The results are shown in Table 6.

Example 7

A process was followed which was identical to that of Example 1, with the exception that in place of the $F(CF_2)_8CH_2CH_2OH$ which was used in Example 1, $F(CF_2)_{17}(COOH)$ (produced by Idemitsu Petrochemical Co., Ltd.) was used, and the electro-sensitive composition of Example 7 was obtained. This composition was in a state of white suspension.

The transparency, and shear stress and current density at various shear rate, during the application of voltage to the composition, were measured in a manner identical to that of Example 1. The results thereof are shown in Table 7.

Example 8

A process was followed which was identical to that of Example 7, with the exception that in place of the silicone oil which was used in Example 7, DOS (produced by Kyowa Hakko Kogyo Co., Ltd.) was used, and the electro-sensitive composition of Example 8 was obtained. This composition was in a state of white suspension.

The transparency, and shear stress and current density at various shear rate, during the application of a DC voltage of 2.0 KV/mm to this composition were measured in a manner identical to that of Example 1. The results thereof are shown in Table 8.

Example 9

A process was followed which was identical to that of Example 1, with the except ion that in place of the $F(CF_2)_8CH_2CH_2OH$ which was used in Example 1, $F(CF_2)_{10}CH_2CH_2OH$ (produced by Daikin Fine Chemicals Laboratory, A-2020) was used, and the electro-sensitive composition of Example 9 was obtained. This composition was in a state of white suspension.

The transparency, and shear stress-and current density at various shear rate, during the application of a voltage to this composition, were measured in a manner identical to that of Example 1. The results thereof are shown in Table 9.

Example 10

A process was followed which was identical to that of Example 9, with the exception that in place of the silicone oil which was used in Example 9, phosphazene oil (produced by Otsuka Chemical Co., Ltd., Otsuka Phospharol NF-46) was used, and the electro-sensitive composition of Example 10 was obtained. This composition was in a state of white suspension.

The transparency, and shear stress and current density at various shear rate, during the application of a DC voltage of 2.0 KV/mm to this composition, were measured in a manner identical to that of Example 1. The results thereof are shown in Table 10.

Example 11

A process was followed which was identical to that of Example 9, with the exception that in place of the silicone oil which was used in Example 9, DOS (produced by Kyowa Hakko Kogyo Co., Ltd.) was used, and the electro-sensitive composition of Example 11 was obtained. This composition was in a state of white suspension.

The transparency, and shear stress and current density at various shear rate, during the application of a DC voltage of 2.0 KV/mm to this composition, were measured in a manner identical to that of Example [. The results thereof are shown in Table 11.

Example 12

A process was followed which was identical to that of Example 1, with the exception that in place of the $F(CF_2)_8CH_2CH_2OH$ which was used in Example 1, $F(CF_2)_{2a}CH_2CH_2OH$ (a mixture in which "a" represents an integer within a range of 3–8, produced by Asahi Glass Co., Ltd., Cm alcohol) was used, and the electro-sensitive composition of Example 12 was obtained. This composition was in a state of white suspension.

The transparency, and shear stress and current density at various shear rate, during the application of a voltage to this composition, were measured in a manner identical to that of Example 1. The results thereof are shown in Table 12.

Example 13

A process was followed which was identical to that of Example 1, with the exception that in place of the $F(CF_2)_8CH_2CH_2OH$ which was used in Example 1, $H(CF_2)_8CH_2OH$ (produced by Daikin Fine Chemicals Laboratory, A-5810) was used, and the electro-sensitive composition of Example 13 was obtained. This composition was in a state of white suspension.

The transparency, and shear stress and current density at various shear rate, during the application of a voltage to this composition, were measured in a manner identical to that of Example 1. The results thereof are shown in Table 13.

Example 14

A process was followed which was identical to that of Example 1, with the exception that in place of the $F(CF_2)_8CH_2CH_2OH$ which was used in Example 1, $H(CF_2)_8COOH$ (produced by Daikin Fine Chemical Laboratory, C-5800) was used, and the electro-sensitive composition of Example 14 was obtained. This composition was in a state of white suspension.

The transparency, and shear stress and current density at various shear rate, during the application of a voltage to this composition, were measured in a manner identical to that of Example 1. The results thereof are shown in Table 14.

Example 15

A process was followed which was identical to that of Example 9, with the exception that in place of the silicone oil which was used in Example 9, partially hydrated triphenyl oil (produced by Nippon Steel Chemical Co., Ltd., Therm-S-900) was used, and the electro-sensitive composition of Example 15 was obtained. This composition was in a state of white suspension.

The transparency, and shear Stress and current density at various shear rate, during the application of a DC voltage of 2.0 KV/mm to this composition, were measured in a manner identical to that of Example 1. The results thereof are shown in Table 15.

Example 16

A process was followed which was identical to that of Example 9, with the exception that in place of the silicone oil which was used in Example 9, a completely fluorinated inert fluid (produced by Sumitomo 3M Co., Ltd., Fluorinert FC-43) was used, and the electro-sensitive composition of Example 16 was obtained. This composition was in a state of white suspension.

The transparency, and shear stress and current density at various shear rate, during the application of a DC voltage of 2.0 KV/mm to this composition, were measured in a manner identical to that of Example 1 . The results thereof are shown in Table 16.

Example 17

A process was followed which was identical to that of Example 9, with the exception that in place of the silicone oil which was used in Example 9, trimellitate oil (produced by Dainippon Ink and Chemical, Inc., Monocizer W-700) was used, and the electro-sensitive composition of Example 17 was obtained. This composition was in a state of white suspension.

The transparency, and shear stress and current density at various shear rate, during the application of a DC voltage of 2.0 KV/mm to this composition, were measured in a manner identical to that of Example 1. The results thereof are shown in Table 17.

Example 18

5 parts by weight of the dioctylsebacate used in Example 4 and 95 parts by weight of the phosphazene oil used in Example 10, were mixed, and a mixed electrically insulating medium was obtained. The $F(CF_2)_7COOH$ which was used in Example 2 was uniformly dispersed in this mixed medium so as to reach an amount of 5 wt %, and the electro-sensitive composition of Example 18 was obtained. This composition, although semitransparent, was in a state of white suspension.

When the transparency of this composition during the application of a DC voltage of 2.0 KV/mm was evaluated in a manner identical to that of Example 1, this composition was found to change to a transparent state.

Example 19

$HOOC-(CF_2)_6-COOH$ (produced by Idemitsu Petrochemical Co., Ltd.) was dispersed uniformly in silicone oil having a viscosity of 0.1 Pa•s at room temperature (produced by Toshiba Silicone Co., Ltd., TSF451-100) so as to reach an amount of 5 wt %, and the electro-sensitive composition of Example 19 was obtained. This composition was in a state of white suspension.

When the transparency of this composition during the application of a DC voltage of 2.0 KV/mm was evaluated in a manner identical to that of Example 1, this composition was found to have changed to a transparent state.

Example 20

A process was followed which was identical to that of Example 19, with the exception that in place of the $HOOC-(CF_2)_6-COOH$ which was used in Example 19, the compound shown in Formula (9) (produced by Idemitsu Petrochemical Co., Ltd.) was used, and the electro-sensitive composition of Example 20 was obtained. This composition was in a state of white suspension.

When the transparency, and shear stress and current density at various shear rate, during the application of a DC voltage of 2.0 KV/mm to this composition were evaluated in a manner identical to that of Example 1, this composition was found to have changed to a transparent state.

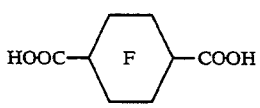

(9)

Example 21

A process was followed which was identical to that of Example 19, with the exception that in place of the HOOC—(CF$_2$)$_6$—COOH which was used in Example 19, HOCH$_2$—(CF$_2$)$_8$—CH$_2$OH (produced by Idemitsu Petrochemical Co., Ltd.) was used, and the electro-sensitive composition of Example 21 was obtained. This composition was in a state of white suspension.

This composition was placed in a concentric-cylinder viscometer, a DC voltage of 1.0 KV/mm was applied between the inner and outer cylinders at a temperature of 25° C., rotation was applied to the inner cylinder, and the transparency of the composition was visually evaluated while agitating the composition.

Furthermore, the rotation of the inner cylinder was varied, and shear stress (Pa) at various shear rate (s$^{-1}$), and current density ($\mu$a/cm$^2$) between the inner and outer cylinders during shear stress measurement, were measured. The results of this measurement are shown in Table 18.

Example 22

A process was followed which was identical to that of Example 19, with the exception that in place of the HOOC—(CF$_2$)$_6$—COOH which was used in Example 19, HOCH$_2$—(CF$_2$)$_3$—CH$_2$OH (produced by Idemitsu Petrochemical Co., Ltd.) was used, and the electro-sensitive composition of Example 22 was obtained. This composition was in a state of white suspension.

The transparency, and shear stress and current density at various shear rate, of this compound were measured in a manner identical to that of Example 21. The results of the measurement s are shown in Table 19.

Example 23

A process was followed which was identical to that of Example 21, with the exception that in place of the silicone oil which was used in Example 21, phosphazene oil (produced by Otsuka Chemical Co., Ltd.) was used, and the electro-sensitive composition of Example 23 was obtained. This composition was in a state of white suspension.

The transparency, and shear stress and current density at various shear rate, of this composition were measured in a manner identical to that of Example 21. The results of the measurements are shown in Table 20.

Comparative Example 1

A process was followed which was identical to that of Example 1, with the exception that in place of the F(CF$_2$)$_8$CH$_2$CH$_2$OH which was used in Example 1, F(CF$_2$)$_2$CH$_2$OH (produced by Daikin Fine Chemical Laboratory, A-1210) was used, and the composition of Comparative Example 1 was obtained.

The F(CF$_2$)$_2$CH$_2$OH dissolved in the medium, and the composition was transparent.

The transparency, and shear stress and current density at various shear rate, during the application of a voltage to this composition were evaluated in a manner identical to that of Example 1. The results thereof are shown in Table 21.

It was clear from the above results that the electro-sensitive compositions of the present invention shown in Examples 1–23 had optical characteristics and viscosities which changed as a result of the application of a voltage.

In contrast, compositions such as that shown in Comparative Example 1, which utilized fluorine compounds which do not fall within the scope of the present invention, exhibited no change in transparency, being transparent before and after the application of voltage, and furthermore, no changes in viscosity could be observed.

TABLE 1

| Applied Voltage (KV/mm) | Trans-parency | Shear rate (s$^{-1}$) | 890 | 534 | 320 | 191 | 115 | 68.5 | 40.9 |
|---|---|---|---|---|---|---|---|---|---|
| 0 | White Suspension | Shear Stress (Pa) | 97.7 | 58.5 | 35.2 | 21.1 | 12.9 | 7.94 | 5.21 |
| 2 | Transparent | Shear Stress (Pa) | 129 | 88.0 | 60.8 | 42.2 | 30.3 | 22.3 | 16.6 |
|  |  | Current Density ($\mu$A/cm$^2$) | <1.3 | <1.3 | <1.3 | <1.3 | <1.3 | <1.3 | <1.3 |

TABLE 2

| Applied Voltage (KV/mm) | Trans-parency | Shear rate (s$^{-1}$) | 890 | 534 | 320 | 191 | 115 | 68.5 | 40.9 |
|---|---|---|---|---|---|---|---|---|---|
| 0 | White Suspension | Shear Stress (Pa) | 98.0 | 58.8 | 35.0 | 20.8 | 12.6 | 7.94 | 4.96 |
| 2 | Semi-transparent | Shear Stress (Pa) | 100 | 65.7 | 47.1 | 34.7 | 27.3 | 18.1 | 11.9 |
|  |  | Current Density ($\mu$A/cm$^2$) | <1.3 | <1.3 | <1.3 | <1.3 | <1.3 | <1.3 | <1.3 |

TABLE 3

| Applied Voltage (KV/mm) | Transparency | Shear rate (s$^{-1}$) | 890 | 534 | 320 | 191 | 115 | 68.5 | 40.9 |
|---|---|---|---|---|---|---|---|---|---|
| 0 | White Suspension | Shear Stress (Pa) | 106 | 62.3 | 37.2 | 22.3 | 13.4 | 8.26 | 5.21 |
| 0.5 | Semi-transparent | Shear Stress (Pa) | 117 | 69.9 | 45.9 | 27.5 | 16.4 | 11.7 | 7.94 |
|  |  | Current Density ($\mu$A/cm$^2$) | <1.3 | <1.3 | <1.3 | <1.3 | <1.3 | <1.3 | <1.3 |
| 1 | Transparent | Shear Stress (Pa) | 125 | 78.6 | 50.8 | 30.3 | 21.3 | 18.6 | 12.4 |
|  |  | Current Density ($\mu$A/cm$^2$) | <1.3 | <1.3 | <1.3 | <1.3 | <1.3 | <1.3 | <1.3 |
| 1.5 | Transparent | Shear Stress (Pa) | 130 | 79.4 | 54.6 | 44.6 | 31.0 | 19.8 | 13.1 |
|  |  | Current Density ($\mu$A/cm$^2$) | <1.3 | <1.3 | <1.3 | <1.3 | <1.3 | <1.3 | <1.3 |
| 2 | Transparent | Shear Stress (Pa) | 136 | 84.3 | 79.4 | 52.1 | 37.2 | 23.6 | 17.4 |
|  |  | Current Density ($\mu$A/cm$^2$) | <1.3 | <1.3 | <1.3 | <1.3 | <1.3 | <1.3 | <1.3 |

TABLE 4

| Applied Voltage (KV/mm) | Transparency | Shear rate (s$^{-1}$) | 890 | 534 | 320 | 191 | 115 | 68.5 | 40.9 |
|---|---|---|---|---|---|---|---|---|---|
| 0 | White Suspension | Shear Stress (Pa) | 23.1 | 13.9 | 8.93 | 4.46 | * | * | * |
| 2 | Transparent | Shear Stress (Pa) | 58.3 | 34.2 | 27.3 | 18.6 | * | * | * |
|  |  | Current Density ($\mu$A/cm$^2$) | <1.3 | <1.3 | <1.3 | <1.3 |  |  |  |

*Impossible to measure as a result of low shear stress.

TABLE 5

| Applied Voltage (KV/mm) | Transparency | Shear rate (s$^{-1}$) | 890 | 534 | 320 | 191 | 115 | 68.5 | 40.9 |
|---|---|---|---|---|---|---|---|---|---|
| 0 | White Suspension | Shear Stress (Pa) | 110 | 64.5 | 37.9 | 22.8 | 13.4 | 8.43 | 5.46 |
| 0.5 | Semi-transparent | Shear Stress (Pa) | 119 | 70.7 | 43.4 | 26.0 | 15.6 | 10.1 | 6.70 |
|  |  | Current Density ($\mu$A/cm$^2$) | <1.3 | <1.3 | <1.3 | <1.3 | <1.3 | <1.3 | <1.3 |
| 1 | Transparent | Shear Stress (Pa) | 126 | 79.4 | 54.6 | 34.7 | 23.6 | 15.6 | 10.4 |
|  |  | Current Density ($\mu$A/cm$^2$) | <1.3 | <1.3 | <1.3 | <1.3 | <1.3 | <1.3 | <1.3 |
| 1.5 | Transparent | Shear Stress (Pa) | 143 | 109 | 67.0 | 44.6 | 27.8 | 20.6 | 13.6 |
|  |  | Current Density ($\mu$A/cm$^2$) | <1.3 | <1.3 | <1.3 | <1.3 | <1.3 | <1.3 | <1.3 |
| 2 | Transparent | Shear Stress (Pa) | 152 | 105 | 71.9 | 45.9 | 33.2 | 24.8 | 17.4 |
|  |  | Current Density ($\mu$A/cm$^2$) | <1.3 | <1.3 | <1.3 | <1.3 | <1.3 | <1.3 | <1.3 |

TABLE 6

| Applied Voltage (KV/mm) | Transparency | Shear rate (s$^{-1}$) | 890 | 534 | 320 | 191 | 115 | 68.5 | 40.9 |
|---|---|---|---|---|---|---|---|---|---|
| 0 | White Suspension | Shear Stress (Pa) | 98.7 | 58.3 | 34.7 | 20.3 | 12.4 | 7.44 | 4.96 |
| 2 | Transparent | Shear Stress (Pa) | 136 | 102 | 67.7 | 54.6 | 43.4 | 33.5 | 24.8 |

TABLE 6-continued

| Applied Voltage (KV/mm) | Transparency | Shear rate (s$^{-1}$) | 890 | 534 | 320 | 191 | 115 | 68.5 | 40.9 |
|---|---|---|---|---|---|---|---|---|---|
| | | Current Density (μA/cm$^2$) | <1.3 | <1.3 | <1.3 | <1.3 | <1.3 | <1.3 | <1.3 |

TABLE 7

| Applied Voltage (KV/mm) | Transparency | Shear rate (s$^{-1}$) | 890 | 534 | 320 | 191 | 115 | 68.5 | 40.9 |
|---|---|---|---|---|---|---|---|---|---|
| 0 | White Suspension | Shear Stress (Pa) | 101 | 60.0 | 35.7 | 19.8 | 11.7 | 7.19 | 4.22 |
| 2 | Transparent | Shear Stress (Pa) | 107 | 71.9 | 71.9 | 67.0 | 52.1 | 37.2 | 29.8 |
| | | Current Density (μA/cm$^2$) | <1.3 | <1.3 | <1.3 | <1.3 | <1.3 | <1.3 | <1.3 |

TABLE 8

| Applied Voltage (KV/mm) | Transparency | Shear rate (s$^{-1}$) | 890 | 534 | 320 | 191 | 115 | 68.5 | 40.9 |
|---|---|---|---|---|---|---|---|---|---|
| 0 | White Suspension | Shear Stress (Pa) | 20.3 | 12.3 | 7.44 | 4.22 | * | * | * |
| 2 | Transparent | Shear Stress (Pa) | 62.0 | 54.7 | 37.2 | 21.1 | 16.1 | * | * |
| | | Current Density (μA/cm$^2$) | <1.3 | 2.6 | 2.6 | 2.6 | 3.9 | | |

*Impossible to measure as a result of low shear stress.

TABLE 9

| Applied Voltage (KV/mm) | Transparency | Shear rate (s$^{-1}$) | 890 | 534 | 320 | 191 | 115 | 68.5 | 40.9 |
|---|---|---|---|---|---|---|---|---|---|
| 0 | White Suspension | Shear Stress (Pa) | 104 | 60.8 | 35.0 | 20.6 | 12.0 | 7.94 | 5.21 |
| 2 | Transparent | Shear Stress (Pa) | 196 | 130 | 94.2 | 64.5 | 37.2 | 24.8 | 16.6 |
| | | Current Density (μA/cm$^2$) | <1.3 | <1.3 | <1.3 | <1.3 | <1.3 | <1.3 | <1.3 |

TABLE 10

| Applied Voltage (KV/mm) | Transparency | Shear rate (s$^{-1}$) | 890 | 534 | 320 | 191 | 115 | 68.5 | 40.9 |
|---|---|---|---|---|---|---|---|---|---|
| 0 | White Suspension | Shear Stress (Pa) | 158 | 95.7 | 57.0 | 34.2 | 20.1 | 12.4 | 7.69 |
| 2 | Transparent | Shear Stress (Pa) | 206 | 169 | 131 | 102 | 75.6 | 54.6 | 42.2 |
| | | Current Density (μA/cm$^2$) | 2.6 | 3.9 | 5.2 | 3.9 | 3.9 | 2.6 | 2.6 |

TABLE 11

| Applied Voltage (KV/mm) | Transparency | Shear rate (s$^{-1}$) | 890 | 534 | 320 | 191 | 115 | 68.5 | 40.9 |
|---|---|---|---|---|---|---|---|---|---|
| 0 | White Suspension | Shear Stress (Pa) | 22.3 | 13.4 | 8.43 | 5.70 | * | * | * |
| 2 | Transparent | Shear Stress (Pa) | 67.0 | 52. | 32.2 | 19.8 | 12.4 | * | * |
| | | Current Density (μA/cm$^2$) | <1.3 | <1.3 | <1.3 | <1.3 | <1.3 | | |

*Impossible to measure as a result of low shear stress.

TABLE 12

| Applied Voltage (KV/mm) | Transparency | Shear rate (s⁻¹) | 890 | 534 | 320 | 191 | 115 | 68.5 | 40.9 |
|---|---|---|---|---|---|---|---|---|---|
| 0 | White Suspension | Shear Stress (Pa) | 101 | 60.8 | 37.0 | 22.3 | 13.9 | 9.18 | 6.20 |
| 2 | Transparent | Shear Stress (Pa) | 171 | 131 | 85.6 | 54.6 | 44.6 | 32.2 | 18.6 |
|   |   | Current Density (μA/cm²) | 2.6 | 6.5 | 11.7 | 15.6 | 13.0 | 10.4 | 7.8 |

TABLE 13

| Applied Voltage (KV/mm) | Transparency | Shear rate (s⁻¹) | 890 | 534 | 320 | 191 | 115 | 68.5 | 40.9 |
|---|---|---|---|---|---|---|---|---|---|
| 0 | White Suspension | Shear Stress (Pa) | 98.0 | 58.5 | 35.2 | 21.2 | 13.1 | 8.43 | 5.21 |
| 2 | Transparent | Shear Stress (Pa) | 120 | 76.9 | 49.6 | 34.7 | 24.8 | 19.1 | 14.9 |
|   |   | Current Density (μA/cm²) | <1.3 | <1.3 | <1.3 | <1.3 | <1.3 | <1.3 | <1.3 |

TABLE 14

| Applied Voltage (KV/mm) | Transparency | Shear rate (s⁻¹) | 890 | 534 | 320 | 191 | 115 | 68.5 | 40.9 |
|---|---|---|---|---|---|---|---|---|---|
| 0 | White Suspension | Shear Stress (Pa) | 104 | 62.7 | 38.4 | 24.8 | 15.9 | 9.92 | 5.95 |
| 2 | Transparent | Shear Stress (Pa) | 112 | 76.9 | 50.8 | 34.7 | 23.1 | 14.9 | 9.92 |
|   |   | Current Density (μA/cm²) | <1.3 | <1.3 | <1.3 | <1.3 | <1.3 | <1.3 | <1.3 |

TABLE 15

| Applied Voltage (KV/mm) | Transparency | Shear rate (s⁻¹) | 890 | 534 | 320 | 191 | 115 | 68.5 | 40.9 |
|---|---|---|---|---|---|---|---|---|---|
| 0 | White Suspension | Shear Stress (Pa) | 55.8 | 33.0 | 19.8 | 12.2 | 7.44 | 5.21 | * |
| 2 | Transparent | Shear Stress (Pa) | 90.0 | 64.5 | 49.6 | 33.5 | 24.1 | 17.9 | 15.6 |
|   |   | Current Density (μA/cm²) | <1.3 | <1.3 | <1.3 | <1.3 | <1.3 | <1.3 | <1.3 |

*Impossible to measure as a result of low shear stress.

TABLE 16

| Applied Voltage (KV/mm) | Transparency | Shear rate (s⁻¹) | 890 | 534 | 320 | 191 | 115 | 68.5 | 40.9 |
|---|---|---|---|---|---|---|---|---|---|
| 0 | White Suspension | Shear Stress (Pa) | 17.1 | 8.43 | 4.22 | * | * | * | * |
| 2 | Transparent | Shear Stress (Pa) | 50.1 | 37.2 | 33.0 | 31.0 | 28.5 | 24.8 | 22.3 |
|   |   | Current Density (μA/cm²) | 1.3 | 1.3 | 1.3 | 1.3 | 1.3 | 1.3 | 1.3 |

*Impossible to measure as a result of low shear stress.

TABLE 17

| Applied Voltage (KV/mm) | Transparency | Shear rate (s⁻¹) | 890 | 534 | 320 | 191 | 115 | 68.5 | 40.9 |
|---|---|---|---|---|---|---|---|---|---|
| 0 | White Suspension | Shear Stress (Pa) | 198 | 127 | 77.4 | 47.1 | 28.0 | 16.9 | 10.4 |
| 2 | Transparent | Shear Stress (Pa) | 280 | 242 | 174 | 138 | 96.7 | 64.5 | 47.1 |
|   |   | Current | <1.3 | <1.3 | <1.3 | <1.3 | <1.3 | <1.3 | <1.3 |

TABLE 17-continued

| Applied Voltage (KV/mm) | Trans-parency | Shear rate (s⁻¹) | 890 | 534 | 320 | 191 | 115 | 68.5 | 40.9 |
|---|---|---|---|---|---|---|---|---|---|
| | | Density ($\mu A/cm^2$) | | | | | | | |

TABLE 19

| Applied Voltage (KV/mm) | Trans-parency | Shear rate (s⁻¹) | 890 | 534 | 320 | 191 | 115 | 68.5 | 40.9 |
|---|---|---|---|---|---|---|---|---|---|
| 0 | White Suspension | Shear Stress (Pa) | 101 | 59.5 | 35.7 | 21.3 | 12.9 | 8.43 | 5.21 |
| 1 | Trans-parent | Shear Stress (Pa) | 108 | 69.4 | 47.1 | 38.4 | 27.3 | 17.4 | 10.4 |
| | | Current Density ($\mu A/cm^2$) | 10.0 | 12.5 | 37.5 | 50.0 | 60.0 | 60.0 | 60.0 |

TABLE 19

| Applied Voltage (KV/mm) | Trans-parency | Shear rate (s⁻¹) | 890 | 534 | 320 | 191 | 115 | 68.5 | 40.9 |
|---|---|---|---|---|---|---|---|---|---|
| 0 | White Suspension | Shear Stress (Pa) | 99.0 | 59.0 | 34.5 | 20.8 | 12.4 | 7.69 | 4.71 |
| 1 | Trans-parent | Shear Stress (Pa) | 112 | 71.2 | 44.4 | 27.8 | 17.4 | 12.9 | 8.43 |
| | | Current Density ($\mu A/cm^2$) | 12.9 | 51.9 | 103.9 | 116.9 | 116.9 | 135.1 | 122.1 |

TABLE 20

| Applied Voltage (KV/mm) | Trans-parency | Shear rate (s⁻¹) | 890 | 534 | 320 | 191 | 115 | 68.5 | 40.9 |
|---|---|---|---|---|---|---|---|---|---|
| 0 | White Suspension | Shear Stress (Pa) | 190 | 114 | 70.4 | 42.9 | 27.3 | 18.6 | 13.1 |
| 1 | Trans-parent | Shear Stress (Pa) | 210 | 136 | 107 | 99.2 | * | * | * |
| | | Current Density ($\mu A/cm^2$) | 13.0 | 26.0 | 103.9 | 311.7' | * | * | * |

*In low shearing rate measurement regions of 115 sec⁻¹ or below, gas bubble formation was observed in the composition, so that measurement was impossible.

TABLE 21

| Applied Voltage (KV/mm) | Trans-parency | Shear rate (s⁻¹) | 890 | 534 | 320 | 191 | 115 | 68.5 | 40.9 |
|---|---|---|---|---|---|---|---|---|---|
| 0 | White Suspension | Shear Stress (Pa) | 84.8 | 50.1 | 29.8 | 17.6 | 10.5 | 6.69 | 4.00 |
| 2 | Trans-parent | Shear Stress (Pa) | 84.8 | 50.3 | 29.8 | 17.6 | 10.5 | 6.69 | 4.00 |
| | | Current Density ($\mu A/cm^2$) | <1.3 | <1.3 | <1.3 | <1.3 | <1.3 | <1.3 | <1.3 |

What is claimed is:

1. An electro-sensitive composition, comprising at least one of the fluorine compounds shown in Formula (3) below:

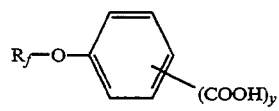
(3)

in the formula, $R_f$ indicates $C_{3x}F_{6x-1}$, x indicates an integer within a range of 2-4, and y indicates an integer within a range of 1-3; and an electrically insulating medium capable of dissolving these fluorine compounds when a voltage is applied thereto.

2. An electro-sensitive composition in accordance with claim 1, wherein said insulating medium is selected from the group consisting of silicone oil, dioctylsebacate, phosphazene oil, partially hydrated triphenyl oil, completely fluoridated inert fluid, trimellitate oil and mixture thereof.

3. An electro-sensitive composition in accordance with claim 1, wherein said electro-sensitive composition contains at least one selected from the group consisting of stabilizers, dispersants, antioxidants, flame retardants, heat-stabilizers, ultraviolet absorbers, antifoaming agents, fungicides, and colorants.

* * * * *